United States Patent [19]

Van Gerwen et al.

[11] Patent Number: 4,903,247
[45] Date of Patent: Feb. 20, 1990

[54] DIGITAL ECHO CANCELLER

[75] Inventors: Petrus J. Van Gerwen; Franciscus A. M. van de Laar; Hendrik J. Kotmans, all of Eindhoven, Netherlands

[73] Assignee: U.S. Philips Corporation, New York, N.Y.

[21] Appl. No.: 210,268

[22] Filed: Jun. 23, 1988

Related U.S. Application Data

[63] Continuation-in-part of Ser. No. 57,561, Jun. 3, 1987, Pat. No. 4,807,173.

[30] Foreign Application Priority Data

Jul. 10, 1987 [NL] Netherlands ............... 8701633

[51] Int. Cl.⁴ .................. H04B 1/06; H04B 3/23
[52] U.S. Cl. .................. 367/135; 367/901; 364/724.18; 379/411
[58] Field of Search ............ 367/901, 135, 137, 132; 364/724.18, 724.19, 724.2; 379/406, 410, 411

[56] References Cited

U.S. PATENT DOCUMENTS 4,736,414 4/1988 Montagna et al. ............. 364/724.19
4,807,173 2/1989 Sommen et al. ............... 364/724.18

OTHER PUBLICATIONS

K. Ochiai et al., "Echo Canceler with Two Echo Path Models", IEEE Transactions on Communications, vol. COM-25, No. 6, Jun. 1977, pp. 589-595.
C. W. K. Gritton and D. W. Lin, "Echo Cancellation Algorithms", IEEE ASSP Magazine Apr. 1984, pp. 30-38.
G. A. Clark et al., "A Unified Approach to Time-and Frequency-Domain Realization of FIR Adaptive Digital Filters", IEEE Transactions on Acoustics, Speech and Signal Processing, vol. ASSP-31, No. 5, Oct. 1983, pp. 1073-1083.
D. Mansour et al., "Unconstrained Frequency-Domain Adaptive Filter," IEEE Transactions on Acoustics, Speech, and Signal Processing, vol. ASSP-30, No. 5, Oct. 1982, pp. 726-734.

Primary Examiner—Thomas H. Tarcza
Assistant Examiner—Daniel T. Pihulk
Attorney, Agent, or Firm—Thomas A. Briody; Jack E. Haken; Jack D. Slobod

[57] ABSTRACT

A digital echo canceller [1] with a good protection against double-talk comprises a first filter [9] for the echo cancellation proper, a second adaptive filter [11] for making continuously adapted filter coefficients available to the first filter [9] and gate means [15] which will only apply the adapted filter coefficients to the first filter [9] if certain conditions are satisfied. In the echo canceller [1] a specific filter combination is used, in which the first filter [9] is a time-domain programmable filter (TDPF) and the second filter [11] is a frequency-domain block-adaptive (FDAF), and further means [20,20(1)] are provided that are arranged in cascade with the gate means [15] for transforming the frequency-domain filter coefficients [W(p;m)] of the FDAF [11] into time-domain filter coefficients [w(i;m)] for the TDPF [9]. These measures result in the advantages of a negligible delay in the echo cancellation by the TDPF [9], and of the possibility to improve in a simple manner the convergence behavior of the FDAF [11] and considerably reduce its computational complexity.

7 Claims, 4 Drawing Sheets

DIGITAL ECHO CANCELLER

RELATED APPLICATION

This application is a continuation-in-part of application Ser. No. 57,561, filed June 3, 1987, now U.S. Pat. No. 4,807,173, granted Feb. 21, 1989.

BACKGROUND OF THE INVENTION

The invention relates to a digital echo canceller with a receive path between a receive input and a receive output, and a send path between a send input and a send output, said echo canceller being used for cancelling an additive echo signal at the send input which has occurred in response to a receive input signal applied to the receive input, said echo canceller including:

a filter combination comprising
- a first digital filter with a programmable filter coefficient memory for generating in response to the receive input signal a first replica signal which is an estimate of the echo signal, and
- a second, adaptive digital filter with a filter coefficient memory for generating in response to the receive input signal a second replica signal which is an estimate of the echo signal, the second digital filter further including means for forming an error signal that is representative of the difference between a signal applied to the send input and the second replica signal, and an adaptation processor for adaptively modifying filter coefficients in response to the receive input signal and the error signal and applying the modified filter coefficients to the filter coefficient memory of this second digital filter;

means for forming a send output signal as the difference between the signal applied to the send input and the first replica signal;

controllable gate means for selectively applying the modified filter coefficients to the programmable filter coefficient memory of the first digital filter; and control means for blockwise determining the respective levels of the error signal and the send output signal, and for generating in response to the levels thus found a control signal for the gate means which depends in a predetermined manner on differences between the respective levels.

A digital echo canceller of such a structure is known from an article entitled "Echo Canceler with Two Echo Path Models" by K. Ochiai et al., published in IEEE Transactions on Communications, Vol. COM-25, No. 6, June 1977, pp. 589-595.

The echo canceller described in this article is especially arranged for combatting the disturbing effect on the echo canceller adjustment caused by double-talk. Double-talk occurs when a desired signal to be transmitted and an echo signal are simultaneously applied to the send input. The superpositioning of these signals then results in that the adjustment of the echo canceller for cancelling the echo signal can be deranged significantly by the signal to be transmitted that is also present. This means that the current echo signal is then no longer cancelled sufficiently by the replica formed by the echo canceller. In the above article a robust solution is given to the problem of a possible misadjustment of the echo canceller caused by double-talk. For this solution a filter combination is used consisting of a first digital filter which comprises a programmable filter coefficient memory and which is used for the echo cancellation proper, as well as a second, adaptive digital filter with an associated filter coefficient memory. These two filters each generate a replica of the echo signal and as long as the replica generated by the adaptive filter is a better estimate of the echo signal than the replica generated by the programmable filter the filter coefficients of the adaptive filter are transferred to the programmable filter. During double-talk the adjustment of the adaptive filter is disturbed and then the transfer of filter coefficients to the programmable filter is interrupted. This achieves that the adjustment of the adaptive filter does not disturb the operation of the programmable filter for the echo canceller proper during double-talk.

This known digital echo canceller is implemented completely in the time-domain. In the field of speech and data transmission, most applications utilize time-domain adaptive filters (TDAF) that are realized as adaptive transversal filters using a least mean square (LMS) algorithm for the adaptation of filter coefficients. When the length of the impulse response of the echo path assumes large values, such as, for example, can be found in applications in the field of acoustics, a TDAF realized as a transversal filter presents the drawback that the complexity expressed in terms of computational operations (multiplications and additions) per output sample increases linearly with the number of discrete-time components with which the impulse response of the echo path can be represented. More specifically, for this known echo canceller it holds that the number of operations required for computing N components is in the order of magnitude of $N^2$ for the programmable filter with respect to the calculation of N samples of the first replica signal, and in the order of magnitude of $N^2$ for the adaptive filter with respect to the calculation of N samples of the second replica signal and also in the order of magnitude of $N^2$ with respect to the calculation of adaptations for N filter coefficients. In addition, a TDAF realized as a transversal filter has a low convergence speed for strongly (auto) correlated input signals, such as speech and specific kinds of data. This is because the convergence speed decreases as the ratio between maximum and minimum eigenvalues of the correlation matrix of the input signal increases. In this connection reference is made to an article entitled "Echo Cancellation Algorithms" by C. W. K. Gritton and D. W. Lin, published in IEEE ASSP Magazine, April 1984, pp. 30-38, more specifically the section "LMS Algorithm" on pp. 32-33.

SUMMARY OF THE INVENTION

The invention has for its object to obviate the above-mentioned drawbacks of a digital echo canceller of the type described in the preamble of Claim 1.

Thereto, a digital echo canceller according to the invention is characterized in that:

in the said filter combination the second digital filter is a frequency-domain block-adaptive filter having a block length of $N'$ components and having, for each signal block m, a number of $N'$ frequency-domain filter coefficients $W(p;m)$ with $p=0,1,2,\ldots,N'-1$, and the first digital filter is a time-domain programmable digital filter having a number of N time-domain filter coefficients $W(i;m)$ with $i=0,1,2,\ldots,N-1$, with $N'$ exceeding N; and the echo canceller further includes transforming means, cascaded with the gate means, for forming the N time-domain filter coefficients w(i;m) required in the first digital filter as components of an N'-point Discrete Orthogonal Transform of a block of N' frequency-domain filter coefficients W(p;m).

Within the scope of the present invention it should be observed that known implementations of a frequency-domain block-adaptive filter can be used for example, those described in an article entitled "A Unified Approach to Time-and Frequency-Domain Realization of FIR Adaptive Digital Filters" by G. A. Clark et al., published in IEEE Transactions on Acoustics, Speech and Signal Processing, Vol. ASSP-31, No. 5, October 1983, pp. 1073–1083, and in an article entitled "Unconstrained Frequency-Domain Adaptive Filter" by D. Mansour et al., published in IEEE Transactions on Acoustics, Speech and Signal Processing, Vol. ASSP-30, No. 5, October 1982, pp. 726–734.

An echo canceller structured in accordance with the invention will lead to a considerable reduction of the computational complexity when for the implementation of the Discrete Orthogonal Transforms (DOT's) or Inverse Discrete Orthogonal Transforms (IDOT's), respectively, fast and efficient algorithms are used. For the widely used Discrete Fourier Transforms (DFT's) as described in the above articles, such computational efficient algorithms are known as Fast Fourier Transform (FFT). More specifically, in that case the order of magnitude of the number of operations required for computing a number of N components can then be given as follows: for the time-domain programmable first digital filter, $N^2$ with respect to the computation of the first replica signal; for the frequency-domain block-adaptive second digital filter, $N'\log N'$ with respect to the computation of the adaptations for the N' frequency-domain filter coefficients and also $N'\log N'$ with respect to the computation of the second replica signal.

The use of such a frequency-domain adaptive filter (FDAF) also enables to considerably improve the convergence properties for highly (auto)correlated input signals, as for each of the substantially orthogonal frequency-domain components the adaption gain of the adaptation algorithm can be normalized in a simple manner according to the power of the frequency-domain component concerned. In this connection reference is again made to the article "Echo Cancellation Algorithms" by C. W. K. Gritton and D. W. Lin, in which such a normalization is briefly described on page 36.

A further considerable advantage linked with the specific filter combination as used in an echo canceller according to the invention is found in the negligible delay with which the first replica signal generated by the time-domain programmable filter (TDPF) is available for cancelling a current echo signal. Owing to this specific filter combination (FDAF and TDPF) the cancelling of the echo signal proper is not accompanied with a significant delay, which would be the case if both filters were implemented in the frequency-domain. For, such a slight delay means that in a duplex-communication link no additional delay in the signal path need be introduced to make a generated replica signal coincide in time with the current echo signal to be cancelled.

After convergence, the filter coefficients of an adaptive digital filter will still fluctuate around their end values, more specifically, due to the presence of noise or signals of a different nature superposed on the reference signal (current echo signal) and due to the finite precision (that is to say, the word length or the number of bits) with which the different signals are represented in the digital filter. With the customary assumptions as to the statistical independence of the different magnitudes in a filter, which assumptions appeared to hold in practice, the separate filter coefficients have the same variance when so-called window functions are not utilized in the adaptation loop of the filter. This means that at a like speed of convergence of the adaptive filter (that is to say, a like gain factor in the adaptation algorithm) the use of N' in lieu of N filter coefficients results in an increase of the filter bottom noise factor (also known as final misalignment factor) by for example 3dB in the practicle event when N'=2N, since this bottom noise factor is determined by the sum of the filter coefficient variances. In practice the gain factor in the adaptation algorithm is selected such that a predetermined value of the bottom noise factor is not exceeded. In order to compensate for an increase of this bottom noise factor in a FDAF, this gain factor should be halved in this practical event of N'=2N, resulting in that the speed of convergence is halved as well.

In the above article by Clark et al. a solution to this problem is proposed in which the N' filter coefficients are obtained by utilizing the window means included in the adaptation loop for carrying out an operation of which the time-domain equivalent is a multiplication by a rectangular window function having the length of N' time-discrete components, and imposing the value of zero on the last N'−N components.

In a digital echo canceller according to the invention it is not necessary, however, that such window means be used in the FDAF, whereas the then increased bottom noise factor nevertheless does not affect the TDPF. True enough, the FDAF uses N' frequency-domain filter coefficients corresponding to N' time-domain filter coefficients, but transferring filter coefficients from the FDAF to the TDPF requires a transformation from the frequency-domain to the time-domain. From the N' corresponding time-domain coefficients the N'−N time-domain coefficients which are extraneous as regards the TDPF can be eliminated in a simple manner during this transformation, so that also the contribution of these N'−N time-domain coefficients to the bottom noise factor of the FDAF does not penetrate to the TDPF. In addition, the window function thus realized can be implemented in a much simpler manner than the window function used in a FDAF, whose implementation considerably adds to computational complexity of a FDAF (compare the description of FIG. 3 in the above article by Clark et al.).

Summarizing: an echo canceller according to the invention results in the following advantages with respect to the prior art techniques:

a considerable reduction of the number of computational operations required for cancelling echo signals; this especially plays a role in echo paths having an impulse response of a large length, such as acoustical echo paths in which a relatively large number (1000 to 2000) of filter coefficients is required for the echo cancellation;

a speed of convergence that can be increased in a simple manner;

an echo cancellation with a negligible delay; and a slight bottom noise despite the absence of window means in the FDAF.

In addition, these advantages are obtained while maintaining a robust solution to the problem of double-talk.

Although in case of double-talk the TDPF is isolated because the supply of filter coefficients from the FDAF is interrupted, this FDAF itself can be misadjusted considerably during double-talk. This means that after double-talk has ended, additional time would be required to remove such a misadjustment (or: misalignment) and subsequently resume supplying properly adjusted coefficients from the FDAF to the TDPF. According to a further aspect of the invention this objection can be met. Thereto, a preferred embodiment of an echo canceller according to the invention is characterized in that:

the echo canceller also comprises a cascade arrangement of second controllable gate means and second transforming means for forming the N' frequency-domain filter coefficients W(p;m) as components of a Discrete Orthogonal Transform of the N filter coefficients w(i;m) in the programmable filter coefficient memory of the first digital filter and for selectively feeding back the thus formed filter coefficients W(p;m) to the second digital filter; and in that the control means are also arranged for blockwise determining the respective levels of the receive input signal and the send input signal, and for generating a second control signal for opening the second gate means if the level of the receive input signal thus determined is lower than the level of the send input signal thus determined.

The properly adjusted filter coefficients present in the TDPF just prior to the occurrence of double-talk can thus be fed back from the TDPF to the FDAF during double-talk. It should be observed that the conveying of filter coefficients from the FDAF to the TDPF and vice versa will take place in mutually separated time intervals, so that the respective transformations concerned are not effected simultaneously. This means that in a practical implementation the available process time can be used efficiently.

An echo canceller according to the invention can advantageously be used in a loudspeaking telephone set. In this respect it is to be recommended, when installing the telephone set, to preprogram the programmable filter coefficient memory in which the filter coefficients supplied are temporarily stored and which forms a part of the TDPF. This is quite possible since a large portion of the echo path between loudspeaker and microphone is determined by the set itself and, therefore, is known. Consequently, the impulse response to be modelled (which is characteristic of the current echo path) can be reasonably approximated in the first instance by inputting as initial values in this programmable filter coefficient memory filter coefficients representing such an approximated model.

BRIEF DESCRIPTION OF THE DRAWING

The invention and its advantages will be further explained hereinbelow with reference to the drawings, in which.

DETAILED DESCRIPTION OF THE PREFERRED EMBODIMENTS

Figure 1:
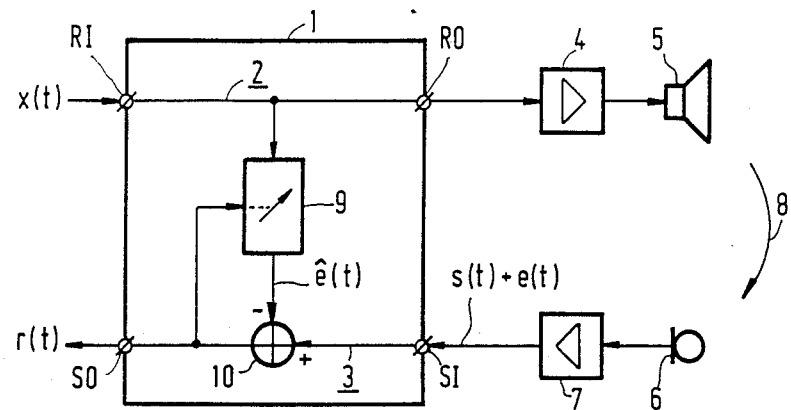
FIG. 1: shows a diagram illustrating the manner in which an echo canceller is generally used in a set used for receiving and transmitting speech signals.

In FIG. 1 is shown a simplified conceptual block diagram of the use of an echo canceller in a telephone set having loudspeaker reproduction of a received speech signal. Such an echo canceller 1 comprises a receive path 2 with a receive input RI and a receive output RO, as well as a send path 3 with a send input SI and a send output SO. A receive input signal x(t), henceforth being denoted as far-end signal, is applied to receive input RI and transferred via receive path 2 to receive output RO which is connected to a loudspeaker 5 via a receive amplifier 4. A microphone 6 generates a signal to be transmitted which is applied as a send input signal s(t) to send input SI via a send amplifier 7, the signal henceforth being denoted as near-end signal. This near-end signal s(t) is transferred via a send path 3 to a send output SO. Between loudspeaker 5 and microphone 6 there is an acoustic echo path symbolically represented in FIG. 1 by an arrow 8. Via this acoustic echo path 8 a far-end signal x(t) at receive output RO can introduce an undesired additive echo signal e(t) at signal input SI, so that a sum signal $z(t)=s(t)+e(t)$ is applied to signal input SI. Echo canceller 1 now has as its task to cancel this undesired echo signal e(t) in the best possible way. Thereto, echo canceller 1 comprises a filter which in response to far-end signal x(t) in receive path 2 generates a signal ê(t) that is a replica of the undesired echo signal e(t). This replica signal ê(t) is subtracted from sum signal $z(t)=s(t)+e(t)$ at send input SI by means of a combining circuit 10 for forming a send output signal r(t) which can be described as $$r(t)=s(t)+[e(t)-ê(t)]$$

From this expression it appears that signal r(t) at send output SO represents the signal to be transmitted s(t) when replica signal ê(t) is a reliable estimate of echo signal e(t), as in that case the second term in the right-hand member of this expression will be practically equal to zero. Generally, the transfer characteristic of the echo path between the receive output RO and send input SI will be time-varying, in which especially acoustic echo path 8 may show large variations. As echo signal e(t), in a good approximation, may be considered to be the linear convolution of far-end signal x(t) with the impulse response h(t) of the echo path between the receive output RO and the send input SI, the shape of time-varying impulse response h(t) will lead to corresponding variations of echo signal e(t) at send input SI. Therefore, filter 9 in echo canceller 1 is arranged as an adaptive filter having as its task to adjust its impulse response w(t) in the best way possible for fitting the impulse response h(t) of echo path RO-SI. The adaptive adjustment of this filter 9 is controlled by signal r(t) at the output of combining circuit 10. This adaptive adjustment is continued as long as there is a correlation between the control signal r(t) and the far-end signal x(t). When only the far-end signal x(t) is present (and, consequently, near-end signal s(t)=0), adaptive filter 9 will generate a replica signal ê(t) which is a reliable estimate of the echo signal e(t). However, when far-end signal x(t) as well as near-end signal s(t) are present, a situation will arise which is commonly referred to as double-talk. If no proper measures are taken, adaptive filter 9 can be considerably misadjusted during double-talk owing to the presence of near-end signal s(t) as a disturbing factor in control signal r(t). This misadjustment of adaptive filter 9 leads to a replica signal ê(t) which is no longer a reliable estimate of echo signal e(t), so that at send output SO a signal r(t) will occur which is disturbed to an annoying degree by an inadequately or even improperly cancelled echo signal.

Since the present invention relates to a digital echo canceller, a discrete-time modelling will be utilized in the following description. Such a modelling can be obtained in the most convenient manner by assuming in the conceptual diagram of FIG. 1 that the signals x(t) and z(t) are applied to receive input RI and send input SI via analog-to-digital converters (not shown), the signals x(t) and r(t) at receive output RO and send output SO are taken off via digital-to-analog converters (not shown), and further that all relevant signals in echo canceller 1 are digital signals. These digital signals are denoted in a conventional manner so that, for example, x(k) denotes a quantized sample of continuous-time signal x(t) at instant t=kT, in which 1/T is the sampling frequency. For completeness it should be observed that in practice a discrete-time signal x(k) to be applied to filter 9 is derived from continuous-time signal x(t) in receive path 2 by means of an analog-to-digital converter between receive path 2 and the input of filter 9 so as to achieve that no unnecessary quantizing noise is introduced into the signal x(t) applied to the loudspeaker 5 through a cascade arrangement of analog-to-digital and digital-to-analog converters. The latter item is disregarded for the further description.

Figure 2:
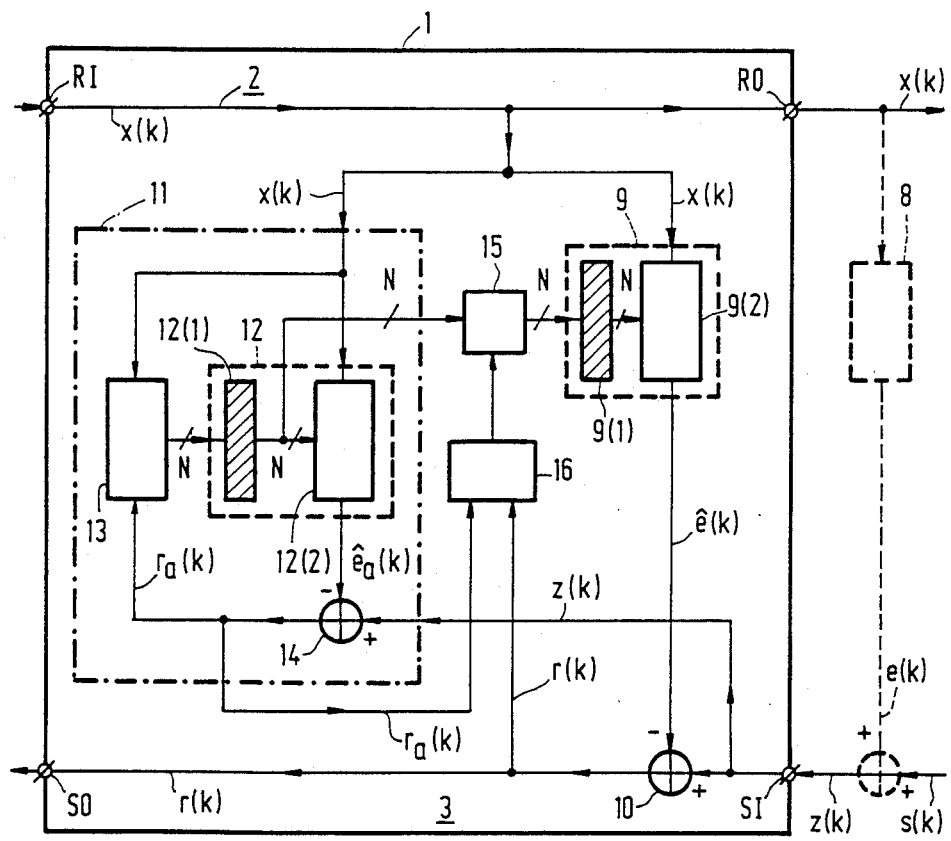
FIG. 2: shows a diagram of a discrete-time model of a known embodiment of a digital echo canceller.

FIG. 2 shows a diagram of a discrete-time model of a known embodiment for a digital echo canceller offering a robust solution to the problem caused by double-talk set forth hereinbefore. Corresponding elements in FIGS. 1 and 2 (and also in the further Figures) are always denoted by the same reference symbols. In FIG. 2 the complete echo path between receive output RO and send input SI is further shown diagrammatically by means of a dashed line block 8, which path produces an undesired echo signal e(k) in response to signal x(k) and is connected through an adder shown in a dashed line to send input SI for forming the sum signal $z(k)=s(k)+e(k)$.

The configuration of echo canceller 1 in FIG. 2 corresponds to that of FIG. 1 in the aforementioned article by Ochiai et al. This echo canceller 1 comprises a filter combination including a first time-domain programmable filter 9 having a programmable memory 9(1) for the filter coefficients, and a second time-domain adaptive filter 11. In response to far-end signal x(k) the first time-domain filter 9 produces a first replica signal ê(k) which is an estimate of echo signal e(k). Thereto, filter 9 comprises a circuit 9(2) for effecting a linear convolution of signal x(k) with the impulse response of filter 9 which is represented with a number of N filter coefficients in memory 9(1) which have values w(i), where i=0,1,2,.. .,N−1 and N is equal to the number of samples used for a sufficiently accurate representation of impulse response h(i) of echo path 8. This first replica signal ê(k) generated by filter 9 is used for the echo cancellation proper and is thereto subtracted in combining circuit 10 from sum signal $z(k)=s(k)+e(k)$ at send input SI for forming signal r(k) at send output SO. The second time-domain adaptive filter 11 is arranged to always have the most suitable values w(i) for the N filter coefficients of the first time-domain filter 9 available. Thereto, filter 11 comprises a time-domain filter section 12, an adaptation processor 13 and a combining circuit 14. In response to far-end signal x(k) filter section 12 generates a second replica signal $ê_a(k)$ which is also an estimate of echo signal e(k). Filter section 12 thereto comprises a memory 12(1) for a number of N filter coefficients and a circuit 12(2) for effecting a linear convolution of signal x(k) with the impulse response of filter 11 which is represented with the N filter coefficients in memory 12(1). By means of combining circuit 14 an error signal $r_a(k)$ is formed representing the difference between sum signal $z(k)=s(k)+e(k)$ at the send input SI and this second replica signal $ê_a(k)$. Adaptation processor 13 is arranged for adaptively correcting each of the N coefficients of filter 11 in response to far-end signal x(k) and error signal $r_a(k)$, and also for constantly applying these N corrected filter coefficients to memory 12(1) of filter section 12 of filter 11. In this manner recently corrected values for the N filter coefficients of the first, programmable filter 9 are constantly available in memory 12(1) of the second, adaptive filter 11. With respect to the adaptation effected in processor 13 it should be observed that for this purpose known algorithms of the least-mean-square type can be used. Furthermore, it is worth mentioning that error signal $r_a(k)$ in FIG. 2 is equal to the difference $z(k)-ê_a(k)$ between the signals at the send input SI and the output of the filter section 12, but that it is equally possible to utilize in a known manner strongly quantized versions of this difference as error signal $r_a(k)$, as a result of which the implementation of adaptation processor 13 can be simplified.

The values of the N filter coefficients in memory 12(1) of adaptive filter 11 are continuously adapted to the variations of impulse response h(i) of echo path 8, but these continuously adapted values are applied only selectively to programmable memory 9(1) of filter 9 via controllable gate means 15. As long as the second replica signal $ê_a(k)$ generated by the adaptive filter 11 is a better estimate of echo signal e(k) than the first replica signal ê(k) generated by programmable filter 9, these gate means 15 are open and the adapted filter coefficients in memory 12(1) of adaptive filter 11 are transferred to programmable memory 9(1) of filter 9. During the double-talk both the near-end signal s(k) and the echo signal e(k) are present at the send input SI, and adaptive filter 11 can be misadjusted to a considerable extent by the presence of near-end signal s(k) as a disturbing term in error signal $r_a(k)$, from which the situation may arise that the first replica signal ê(k) is a better estimate of the echo signal e(k) than the second replica signal $ê_a(k)$. In such a situation the gate means 15 are blocked and the supply of adapted filter coefficients to programmable memory 9(1) is interrupted. This achieves that programmable filter 9 is rendered so to say immune to a possible misadjustment of adaptive filter 11 during double-talk, so that in that case too an effective cancellation of echo signal e(k) is guaranteed as long as echo path 8 is not subject to significant changes.

As a most important criterion for controlling the gate means 15 is used the mutual relationship between the levels of the error signal $r_a(k)$ in adaptive filter 11 and of signal r(k) at send output SO. Thereto, the echo canceller 1 in FIG. 2 comprises control means 16 arranged for blockwise determining the respective levels of the error signal $r_a(k)$ and send output signal r(k). In response to these levels, determined blockwise, of the signals $r_a(k)$ and r(k), control means 16 produce a control signal for gate means 15 which depends in a predetermined manner on the differences between these levels. In accordance with the above article by Ochiai et al. a control signal is produced for opening gate means 15 for applying adapted filter coefficients to programmable memory 9(1) when the following condition is satisfied $$L[r_a(k)] < c_1 L[r(k)] \qquad (1)$$

In this expression the symbol L denotes the level of the relevant signal in a block of a number of M consecutive signal samples and $c_1$ is a positive constant of a value smaller than 1. In the case of speech signals having a sampling rate of 1/T=8 kHz, a possible choice for M and $c_1$ can be, for example, the values of M=128 and $c_1$=0.875. As is known, the level L of a signal in a block of M signal samples can be represented in different ways, for example, by the average value, over one block, of the amplitude or of the power of the signal samples, but also by the peak value of the amplitude of the signal samples in this block. In the following description it will be assumed that the level L is related to the average value, over one block, of the power of the signal samples, but self-evidently, this assumption does not imply a restriction of the idea of signal level.

The above condition (1) indicates that the level of the error signal $r_a(k)$ is more than $-20 \log c_1$ dB lower than the level of the send output signal r(k). In a practical implementation of control means 16 condition (1) is further required to be satisfied for a number of D consecutive blocks of M signal samples before the control signal opens the gate means 15 for applying filter coefficients to programmable memory 9(1) of filter 9. For example, the value D=3 can be selected for the said values for M and $c_1$.

The control of gate means 15 on the basis of condidition (1) appears to be sufficient in practice to avoid in most cases the disturbance of echo cancellation during double-talk. This control can be improved by demanding in accordance with the above article by Ochiai et al., that a control signal for opening gate means 15 should only be generated when, in addition, the following conditions:

$$L[r_a(k)] < c_2 L[z(k)] \qquad (2)$$

$$L[z(k)] < c_3 L[x(k)] \qquad (3)$$

are satisfied simultaneously, in which $c_2$ and $c_3$ are positive constants having a value smaller than 1. Once these conditions (1), (2) and (3) are satisfied simultaneously for D consecutive blocks of M signal samples, the gate means 15 are opened and in the opposite case the gate means 15 are blocked so that the supply of adapted filter coefficients to programmable memory 9 (1) is interrupted. Condition (2) indicates that the level of error signal $r_a(k)$ is more than $-20 \log c_2$ dB lower than the level of the send input signal z(k). When double-talk is absent, thus in the case when near-end signal s(k)=0, condition (2) implies that the cancelling of echo signal e(k) by second replica signal $\hat{e}_a(k)$ is better than $-20 \log c_2$ dB. Condition (3) implies that the transfer of adapted filter coefficients is interrupted when the level of send input signal z(k) is less than $-20 \log c_3$ dB lower than the level of far-end signal x(t), so when it is evident that double-talk occurs.

As it has already extensively been explained hereinbefore, such an echo canceller with a filter combination of two time-domain filters 9 and 11 has the inherent objections that the complexity, expressed in terms of computational operations (multiplications and additions) per output sample, for programmable filter 9 as well as adaptive filter 11, increases linearly with the number of N samples used for a sufficiently accurate representation of impulse response h(i) of echo path 8, whilst the adaptive filter 11 usually realized as a transversal filter has a low speed of convergence for strongly (auto)correlated far-end signals x(k), such as speech and specific types of data. These objections weigh especially heavily when impulse response h(i) of echo path 8 has a large length with values N from 1000 to 2000, as is the case with the acoustic echo paths under discussion.

Figure 3:
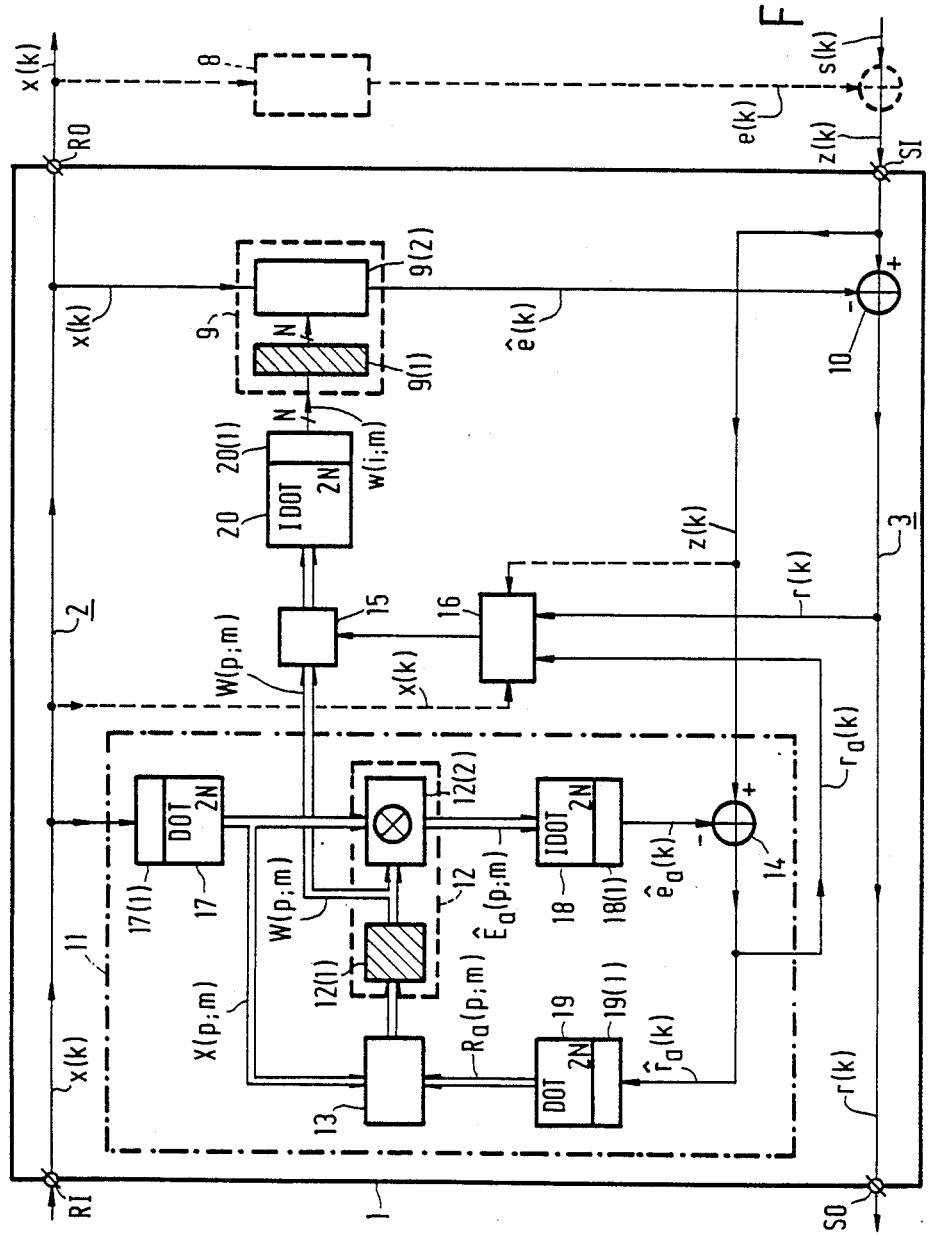
FIG. 3: shows a general diagram of a discrete-time model of an embodiment of a digital echo canceller according to the invention.

FIG. 3 shows a general diagram of a discrete-time model of an embodiment for a digital echo canceller according to the invention, by means of which the above objections of the known echo canceller described with reference to FIG. 2 are met.

Thereto, an echo canceller according to the invention includes a specific filter combination, in which the first digital filter 9 is a time-domain programmable filter (TDPF) and the second digital filter 11 is a frequency-domain block-adaptive filter (FDAF). The choice of this specific filter combination (9,11) is based on the consideration that TDPF 9 operates on a sample-by-sample basis so that the first replica signal ê(k) for cancelling a current echo signal e(k) at the send input SI is available with a delay of one sample interval which is negligibly small in practice, and the use of a FDAF 11 enables a considerable saving in numbers of computational operations and, in addition, enables to improve considerably in a simple manner the convergence behaviour of the echo canceller 1, while retaining the robust solution to the problem of double-talk which is explained with reference to FIG. 2.

In FIG. 3 the general structure of a frequency-domain block-adaptive filter 11 is represented in a general diagram. In FIG. 3 and in the next Figures double-lined signal paths denote paths in the frequency-domain and single-lined signal paths denote paths in the time-domain. Transformations from the time-domain to the frequency-domain and vice versa are effected by means of Discrete Orthogonal Transforms (DOT's) and their inverses (IDOT's), respectively. An illustrative example of such transformations is the Discrete Fourier Transform (DFT) and its inverse (IDFT), which are utilized extensively, compare the above articles by Clark et al. and Mansour et al. For practical reasons of computational complexity and permissible signal delays these DOT's have a finite block length N' and in the literature such transformations are known as N'-point DOT's, in which "point" may refer both to a discrete time-domain component and to a discrete frequency-domain component. With respect to the block length N' the following observations are made. FDAF 11 has to generate a replica signal $\hat{e}_a(k)$ which is a good estimate of echo signal e(k). Echo signal e(k), in its turn, may be considered to be a linear convolution of far-end signal x(k)

with impulse response h(i) of echo path 8 with i=0,1,2, ...,N−1. It need not be further elucidated that FDAF 11 also has to present an impulse response of a length N for generating a replica signal ê$_a$(k) as the linear convolution of far-end signal x(k) with the impulse response of FDAF 11. In FDAF 11 the operations required thereto are effected on blocks of N' points in the frequency-domain, and it is well known that these operations correspond with a circular convolution in the time-domain, in which the period is equal to the block length N'. The desired linear convolution can then be obtained by applying a suitable sectioning of the time-domain signals which are involved in the N'-point DOT's, in which the most common sectioning procedures are the overlap-save method and the overlap-add method. The above implies that generally the block length N' of the DOT's exceeds the desired length N of the impulse response of FDAF 11. In the above article by Clark et al. it is stated that for the most efficient implementation of FDAF 11 presenting an impulse response having the length of N, use is made of DFT's having a block length N'=2N, and of a sectioning of time-domain signals into blocks of N'=2N points in which each block overlaps the previous block by N points. For large values of N, for example N=1000 to N=2000 in the present case of acoustic echo paths 8, the computational complexity can yet be decreased considerably by utilizing efficient implementations of the DFT's known as "Fast Fourier Transform" (FFT), due to which the number of computational operations per N points of replica signal ê$_a$(k) is of the order of N log N. Such computationally efficient implementations are also known for other types of DOT's than the DFT, but for simplicity it will be assumed hereinafter that the N'-point DOT is an N'-point DFT with N'=2N. In addition, frequency-domain signals will be denoted by upper case letters to differentiate in a simple manner between frequency-domain and time-domain signals, whilst the time-domain signals, as was done in the foregoing, are denoted by lower-case letters. Finally, the further description is aimed at applying the overlap-save method as a sectioning procedure of the time-domain signals.

The structure of FDAF 11 shown in FIG. 3 can most conveniently be described with reference to the structure of time-domain adaptive filter 11 in FIG. 2. FDAF 11 again comprises a filter section 12, an adaptation processor 13 and a combining circuit 14, but in FIG. 3 filter section 12 and adaptation processor 13 operate in the frequency-domain, so that three domain transformations have to be effected, that is to say by means of transforming means 17 and associated sectioning means 17(1): a 2N-point DOT, for transforming each block of 2N time-domain points of far-end signal x(k) into a block of 2N frequency-domain points, which are denoted X(p;m) with p=1,2,2, ... ,2N−1 for a block of block number m;

by means of transforming means 18 and associated sectioning means 18(1): a 2N point IDOT, for transforming each block of 2N frequency-domain points Ê$_a$(p;m) into a block of N time-domain points of replica signal ê$_a$(k);

by means of transforming means 19 and associated sectioning means 19(1): a 2N-point DOT, for transforming each block of N time-domain points of error signal r$_a$(k), after it has been augmented to a block of 2N time-domain points, to a block of 2N frequency-domain points R$_a$(p;m).

The details of the overlap-save method used for the sectioning procedure will be further explained with reference to FIG. 4. Filter section 12 of FDAF 11 comprises a memory 12(1) for storing the 2N frequency-domain filter coefficients W(p;m) of block m and a circuit 12(2) for multiplying each frequency-domain point X(p;m) by an associated frequency-domain filter coefficient W(p;m), for forming products X(p;m)W(p;m) representing the 2N frequency-domain points Ê$_a$(p;m). Adaptation processor 13 is further arranged for obtaining in response to the 2N frequency-domain points X(p;m) and R$_a$(p;m) blockwise-adapted frequency-domain filter coefficients W(p;m) which are stored in memory 12(1).

Because it is the task of FDAF 11 to always present the most suitable values for the filter coefficients of TDPF 9, but because the filter coefficients W(p;m) of FDAF 11 are frequency-domain filter coefficients, a domain-transformation has to be effected for the selective transfer of filter coefficients from FDAF 11 to TDPF 9. Thereto, echo canceller 1 in FIG. 3 also includes transforming means 20 and associated sectioning means 20(1) for effecting a 2N-point IDOT to transform the 2N frequency-domain filter coefficients W(p;m) at the output of memory 12(1) of FDAF 11 into N time-domain filter coefficients w(i;m) to be applied to programmable memory 9(1) of TDPF 9. These transforming and sectioning means 20,20(1) are included in a cascade arrangement with controllable gate means 15 (subsequent thereto in FIG. 3). It has further been shown diagrammatically in FIG. 3 by means of dashed lines to control means 16 that the control of gate means 15 does not only depend on the levels of signals r$_a$(k) and r(k) in accordance with condition (1), but can also depend on the levels of signals z(k) and x(k) in accordance with conditions (2) and (3) as explained in the description of FIG. 2.

A drawing in further detail of a digital echo canceller according to FIG. 3 will now be given with reference to FIG. 4 in which it has been indicated explicitly that the N'-point DOT is an efficient implementation of an N'-point DFT with N'=2N known as 2N-point FFT, and in which the sectioning means are shown separated from the transforming means to describe their functioning in a clearer manner.

Figure 4:
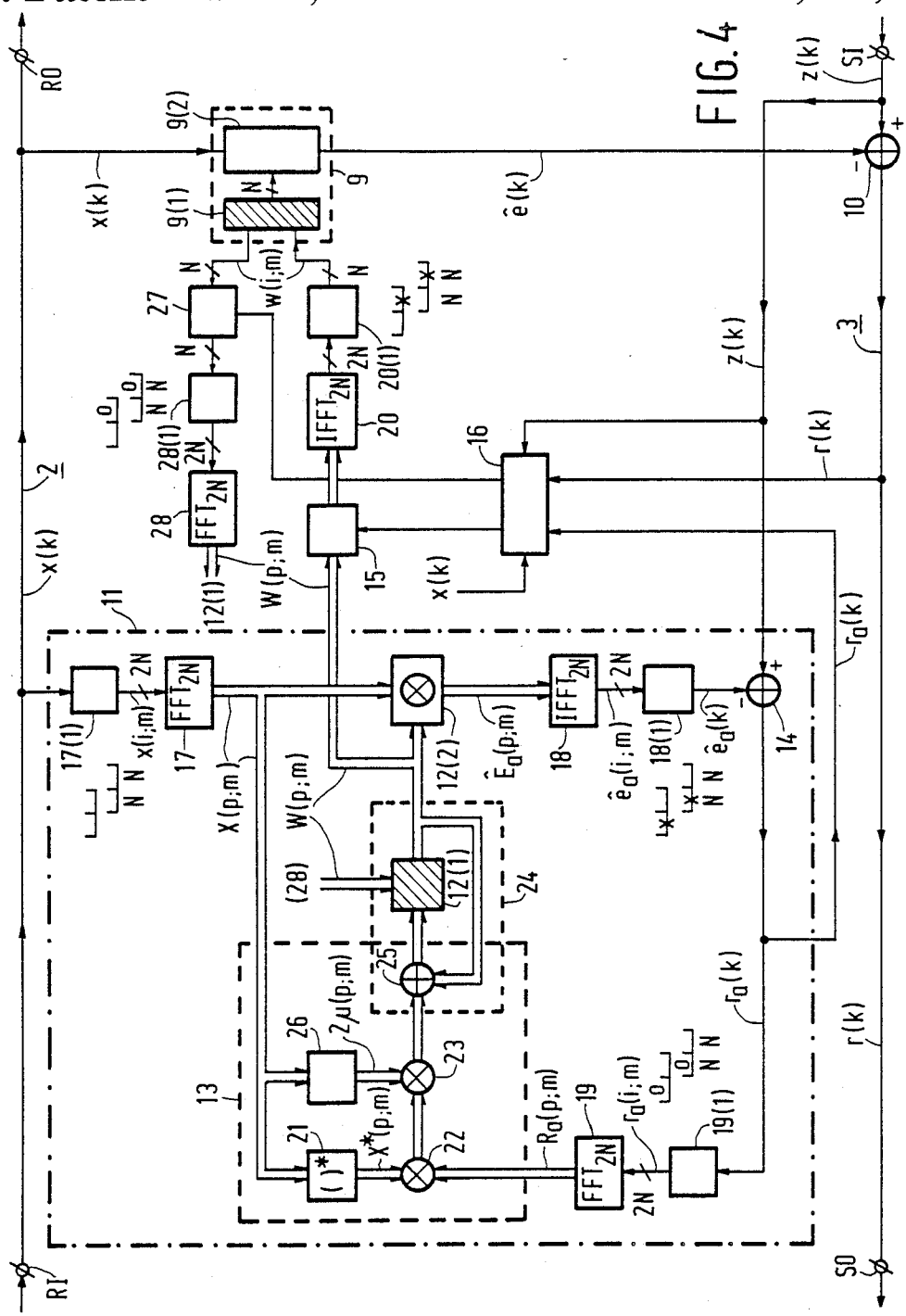
FIG. 4: shows a more detailed diagram of a discrete-time model of an embodiment of a digital echo canceller according to the invention.

In FIG. 4 far-end signal x(k) is applied to sectioning means 17(1) to be subdivided into blocks of 2N points by means of serial-to-parallel conversion, each block overlapping its predecessor by N points, as is shown symbolically in FIG. 4. The points of a block of block number m are denoted x(i;m) with i=1,2, ... ,2N−1. With the aid of transforming means 17 for effecting a 2N-point FFT the 2N time-domain points x(i;m) are transformed into 2N frequency-domain points X(p;m) with p=1,2, ... ,2N−1. In multiplier circuit 12(2) each point X(p;m) is multiplied by a relevant filter coefficient W(p;m) from memory 12(1) for forming products X(p;m)W(p;m) which represent 2N points Ê$_a$(p;m). With the aid of transforming means 18 for effecting a 2N point IFFT these 2N points Ê$_a$(p;m) are transformed into 2N points ê$_a$(i;m) in the time-domain. Because the filter coefficients W(p;m) can be considered to be points of a 2N-point DFT effected on time-domain filter coefficients w(i;m) which represent values of impulse response w(i) during block m, the multiplication in circuit 12(2) corresponds to a time-domain circular convolution of far-end signal x(k) during block m with impulse response w(i) during block m. The desired replica signal $ê_a(k)$, however, is the linear convolution of far-end signal $x(k)$ with impulse response $w(i)$. In accordance with the overlap-save method this desired replica signal $ê_a(k)$ is now obtained by applying the 2N points $ê_a(i;m)$ of this circular convolution for each block m to sectioning means 18(1), in which by means of parallel-to-serial conversion the first N points $ê_a(i;m)$ with $i=0,1,2,\ldots,N-1$ are discarded and the last N points $ê_a(i;m)$ with $i=N,N+1,N+2,\ldots,2N-1$ are transferred as replica signal $ê_a(k)$, as is shown symbolically in FIG. 4.

For the blockwise adaptation of the frequency-domain filter-coefficients $W(p;m)$ a known adaptation algorithm is utilized, for example, a complex least mean-square (complex LMS) algorithm. According to the latter algorithm these filter coefficients $W(p;m)$ are adapted as long as there is a correlation between far-end signal $x(k)$ and error signal $r_a(k)$. Since adaptation processor 13 operates in the frequency-domain, according to the overlap-save method this error signal $r_a(k)$ is applied to sectioning means 19(1) to be subdivided by means of serial-to-parallel conversion into blocks of 2N points, each block overlapping its predecessor by N points and forcing upon the first N points $r_a(i;m)$ with $i=0,1,2,\ldots,N-1$ the value of zero, as is shown symbolically in FIG. 4. With the aid of transforming means 19 for effecting a 2N-point FFT, these 2N points $r_a(i;m)$ are transformed into the frequency-domain in 2N points $R_a(p;m)$. The 2N points $X(p;m)$ of each block m are further applied to conjugating means 21 for forming the complex conjugate value $X^*(p;m)$ of each point $X(p;m)$. In a multiplier circuit 22 each conjugate point $X^*(p;m)$ is multiplied by the associated point $R_a(p;m)$ for forming products $X^*(p;m)R_a(p;m)$ which correspond with the time-domain circular correlation between far-end signal $x(k)$ and error signal $r_a(k)$ during block m. Each of the 2N products $X^*(p;m)R_a(p;m)$ is multiplied by an amount of $2\mu(p;m)$ in a further multiplier circuit 23, $\mu(p;m)$ being the gain factor in the adaptation algorithm, so that a product $A(p;m)$ with $$A(p;m)=2\mu(p;m)X^*(p;m)R(p;m)$$

is formed which determines the modification of filter coefficient $W(p;m)$. These modifications $A(p;m)$ are applied to accumulator means 24 constituted by memory 12(1) for storing the filter coefficients $W(p;m)$ of block m and an adder 25 for forming the sum of each coefficient $W(p;m)$ and its associated modification $A(p;m)$, which sum is stored in memory 12(1) for producing the filter coefficients $W(p;m)$ for the next block $(m+1)$. The adaptation algorithm can thus be written as $$W(p;m+1)=W(p;m)+2\mu(p;m)X^*(p;m)R(p;m)$$

The 2N filter coefficients $W(p;m)$ in memory 12(1) are thus available for the multiplications in circuit 12(2) as well as the transfer to TDPF 9.

If the far-end signals $x(k)$ are uncorrelated or correlated only to a slight degree, gain factor $\mu(p;m)$ can have a same constant value $\alpha$ for each of the filter coefficients $W(p;m)$, which value is independent of block number m (this constant value $\alpha$ is known as the adaptation factor of the algorithm). For strongly (auto)correlated far-end signals $x(k)$, such as speech, the speed of convergence of FDAF 11 can be considerably increased in a simple manner by decorrelating far-end signals $x(k)$, which can be effected by normalizing their power spectrum (see for example page 36 of the above article by Gritton and Lin). Since in FDAF 11 the frequency-domain points $X(p;m)$ are already available, such a normalization can be performed in a simple manner with the aid of normalizing means 26, in which the adaptation factor $\alpha$ is divided by the power $|X(p;m)|^2$ of point $X(p;m)$ and the resulting quotient, after a blockwise smoothing with the aid of a simple recursive filter, is used as gain factor $\mu(p;m)$ for the multiplication by $2\mu(p;m)$ in circuit 23.

As already explained hereinbefore, the filter coefficients $W(p;m)$ in memory 12(1) are to be regarded as points of a 2N-point DFT effected on 2N time-domain filter coefficients $w(i;m)$ during block m. This ensues that the 2N filter coefficients $W(p;m)$, which have passed controllable gate means 15, are transformed into 2N time-domain filter coefficients $w(i;m)$ in transforming means 20 for effecting a 2N-point IFFT. However, TDPF 9 possesses no more than N time-domain filter coefficients $w(i;m)$ with $i=0,1,2,\ldots N-1$ which are stored in memory 9(1) and are used in convolution circuit 9(2) for generating a first replica signal $ê(k)$ during block m. The remaining N time-domain filter coefficients $W(i;m)$ with $i=N,N+1,N+2,\ldots 2N-1$ are extraneous as regards TDPF 9 and are therefore discarded in sectioning means 20(1), as is symbolically shown in FIG. 4. As also explained hereinbefore, after convergence of FDAF 11, the 2N filter coefficients $W(p;m)$ and hence also the 2N corresponding filter coefficients $w(i;m)$ will keep fluctuating around their final values due to the finite precision (that is to say, wordlength or number of bits) of the signal representation in FDAF 11 and due to the presence of noise and other types of disturbing signals in sum signal $z(k)$ at send input SI (in addition to echo signal $e(k)$ which has to be cancelled). The variances of the fluctuating filter coefficients will all have a same value when gain factors $\mu(p;m)$ have been chosen in the manner described in the preceding paragraph. An important parameter for the convergence behaviour of a block-adaptive filter is the ratio $\beta(m)$ of the variance of the residual echo signal $[e(k)-ê(k)]$ in block m to the variance of echo signal $e(k)$ in block m (as is well known, this variance corresponds with the mean signal power value over a block m, when the relevant signal is a signal having a zero mean value). The final value $\beta$ of $\beta(m)$ after convergence is known as the bottom noise factor (or final misalignment factor). This final value $\beta$ is mainly determined by the sum of the variances of the filter coefficients (at the customary values of the adaptation factor $\alpha$). The fact that each time a number of N of a set of 2N time-domain filter coefficients $w(i;m)$ are extraneous as regards TDPF 9 implies that the final value $\beta$ for FDAF 11 is actually unnecessarily higher by a factor of two (3 dB) than the final value $\beta$ for a TDAF which is equivalent to FDAF 11, and which has no more than N time-domain filter coefficients. As already explained in the introductory part of the present description, this increase of the final value $\beta$ can be prevented by halving the adaptation factor $\alpha$ as a result of which also the speed of convergence is halved. A solution to this problem is described in the above article by Clark et al., which solution consists of inserting window means in adaptation processor 13 of FDAF 11, that is to say between multiplying circuit 23 and adder 25. In view of the intended reduction of the computational complexity, however, the implementation of these window means in FDAF 11 of echo canceller 1 according to the invention is abandoned (for the implementation of these window means considerably adds to the computational complexity of a FDAF, as described with reference to FIG. 3 in the article by Clark et al.). The consequent augmentation of the final value $\beta$ in FDAF 11 of FIG. 4 does not affect TDPF 9, however, because the sectioning means 20(1) inserted between transforming means 20 and memory 9(1) of TDPF 9 ensure that the N filter coefficients w(i;m) with i=N,N+1, N+2, ... 2N−1 are discarded, so that also the contribution of these N filter coefficients to the final value $\beta$ of FDAF 11 does not penetrate to TDPF 9. Worded differently, the final value $\beta$ of FDAF 11 is actually decreased by a factor of two (3 dB) as regards TDPF 9. The window function thus obtained can be implemented in an extremely simple manner, because sectioning means 20(1) can be realized by interconnecting only a number of N of a set of 2N inputs to a set of N outputs.

Although in case of double-talk TDPF 9 is isolated because the supply of filter coefficients from FDAF 11 is interrupted, FDAF 11 itself can be considerably misadjusted during double-talk. This means that after double-talk has ended extra time is required to eliminate this misadjustment (or: misalignment) and then resume the supply of properly adjusted filter coefficients from FDAF 11 to TDPF 9.

According to a further aspect of the invention this drawback can be obviated by copying back as it were into memory 12(1) of FDAF 12 the set of N filter coefficients which was present in programmable memory 9(1) of TDPF 9 just prior to the occurrence of double-talk, so that after double-talk has ended, the recovery time of FDAF 11 for reaching convergence is reduced considerably and the applying of properly adjusted filter coefficients to TDPF 9 can be resumed at an appreciably earlier instant. The means for this copying back are formed in FIG. 4 by a cascade arrangement of second controllable gate means 27 and transforming means 28 with associated sectioning means 28(1). Gate means 27 are normally in a closed position, but when they are open, the N filter coefficients w(i;m) with i=0,1,2, ... ,N−1 for each block m are read (non-destructively) from memory 9(1), applied to sectioning means 28(1) and augmented therein to a set of 2N coefficients w(i;m), the value of w(i;m)=0 being imposed on the last N coefficients w(i;m) with i=N,N+1, N+2, ... ,2N−1. With the aid of transforming means 28 for effecting a 2N-point FFT these 2N coefficients w(i;m) are transformed into the frequency-domain in 2N coefficients W(p;m) which are applied to memory 12(1) of FDAF 11 to be written over the values occurring during double-talk. The control means 16 are also arranged for blockwise determining the levels of send input signal z(k) and far-end signal x(k) and generate a second control signal for opening the second gate means 27 when the following condition is satisfied:

$$L[z(k)] > c_3 L[x(k)] \quad (4)$$

that is to say, when the level of send input signal z(k) is less than $-20 \log c_3$ dB lower than the level of far-end signal x(k), so when there is distinct evidence that double-talk occurs. A comparison with condition (3) in the aforementioned shows that condition (4) and condition (3) are exactly each other's opposites, and that meeting condition (3)—provided that conditions (1) and (2) are met simultaneously—results in the opening of gate means 15 and closing of gate means 27, whilst meeting condition (4) produces just the opposite result. It should be observed that, analogous to the case of the gate means 15, the control of gate means 27 can be improved by making further conditions on the generation of a second control signal for opening gate means 27. However, in practice it appears that a control only on the basis of condition (4) is amply sufficient. With respect to the values of the positive constants $c_1$, $c_2$ and $c_3$ in the conditions (1)–(4) it should be observed that in an echo canceller according to the invention in the case of speech signals it holds that the value $c_1$ is slightly smaller than 1, the value $c_2$ is about $\frac{1}{8}$ to $\frac{1}{4}$ and the value $c_3$ is about $\frac{1}{8}$ to $\frac{1}{4}$.

Figure 5:
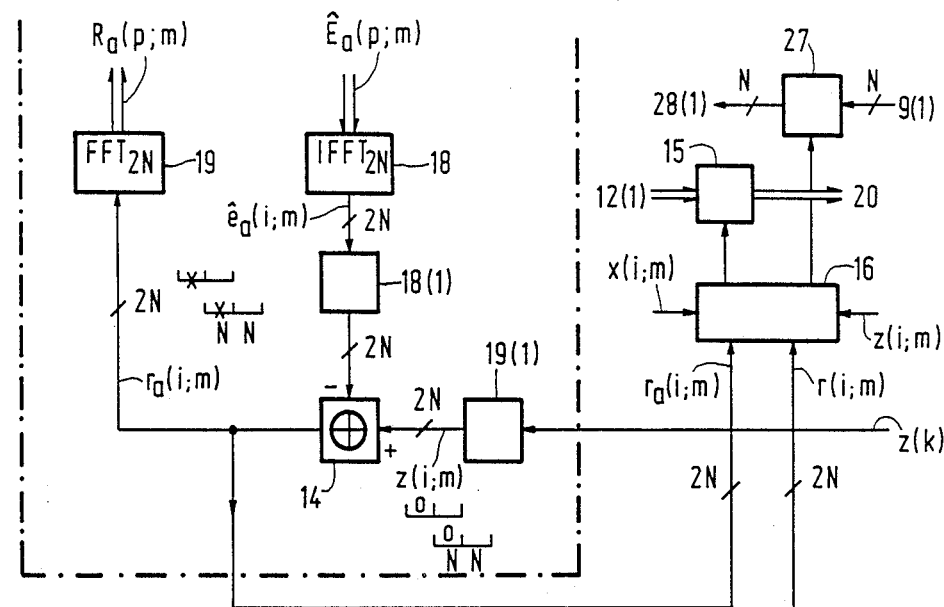
FIG. 5: shows a diagram of a variant of a portion of the embodiment as shown in FIG. 4, to illustrate a different implementation of the overlap-save method.

FIG. 5 shows a portion of echo canceller 1 according to FIG. 4 to illustrate that the sectioning procedure of the overlap-save method can be implemented in various ways. FIG. 5 differs from FIG. 4 in that sectioning means 19(1) from FIG. 4 have now been transferred to the input of combining circuit 14 and now sum signal z(k) is subdivided into blocks of 2N points z(i;m) in sectioning means 19(1) with the aid of serial-to-parallel conversion, each block overlapping its preceding block by N points and the value of zero being imposed on the first N points z(i;m) with i=0,1,2, ... ,N−1, as shown symbolically in FIG. 5. In FIG. 5, sectioning means 18(1) perform the same function as in FIG. 4, but now in FIG. 5 without utilizing parallel-to-serial conversion. The above differences with respect to FIG. 4 result in that combining circuit 14 in FIG. 5 should now have 2N inputs for 2N points $\hat{e}_a(i;m)$ and 2N inputs for 2N points z(i;m) at the outputs of the respective sectioning means 18(1) and 19(1), and that at the 2N outputs of combining circuit 14 in FIG. 5 the 2N points $r_a(i;m)$ should be available for transforming means 19. As regards a practical implementation of FIG. 5 it should be observed that naturally use is made of the fact that when sectioning is effected in sectioning means 18(1) and 19(1) the following holds: $\hat{e}_a(i;m)=0$ and z(i;m)=0 for the values i=0,1,2, ... ,N−1, so that combining circuit 14 only needs to possess a number of N inputs for N points $\hat{e}_a(i;m)$ and a number of N inputs for N points z(i;m) for the values i=N,N+1,N+2 ... ,2N−1. Needless to observe that combining circuit 14 in that case only has N outputs for the N points $r_a(i;m)$ with these values i=N,N+1,N+2, ... 2N−1. As it holds that $r_a(i;m)=0$ for the values i=0,1,2, ... ,N−1, the required 2N points $r_a(i;m)$ at the 2N inputs of transforming means 19 can easily be obtained by permanently applying to the N inputs a zero value for these values i. A last difference with FIG. 4 is that control means 16 in FIG. 5 now receive blocks of 2N points $r_a(i;m)$ and also blocks of 2N points r(i;m) which have been obtained from send output signal r(k), as is shown symbolically in FIG. 5, with the aid of sectioning means 29 having the same function as sectioning means 19(1). In the same manner blocks of 2N points x(i;m) and z(i;m) at the output of the respective sectioning means 17(1) and 19(1) are applied to control means 16 for satisfying conditions (2) and (3). It is self-evident that with a practical implementation of control means 16 the numbers of inputs for these blocks are not 2N, but N, whilst for each block m only the last N points x(i;m) with i=N,N+1,N+2, ... ,2N−1 are recovered from sectioning means 17(1). Naturally, for determining the respective levels in control means 16 in FIG. 5, the block length is preferably equal to N or an integral multiple of N.

Figure 6:
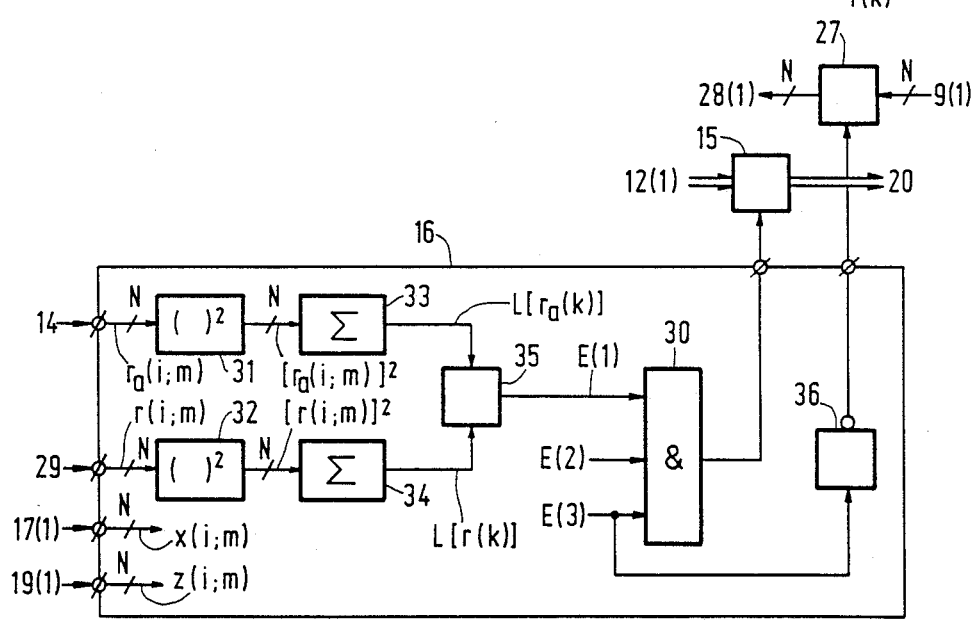
FIG. 6: shows a diagram of an optional implementation of the control means shown in FIG. 5 for generating control signals for the gate means used for conveying filter coefficients.

FIG. 6 illustrates a possible implementation of the control functions which in the case of FIG. 5 are performed in control means 16 for generating control signals for the gate means 15 and 27 of the echo canceller. For controlling gate means 15 use is made of an AND-gate 30 having three inputs receiving preparation signals E(1), E(2) and E(3) when the respective conditions (1), (2) and (3) as they have been stated hereinbefore are satisfied. Only when these three conditions are satisfied simultaneously, will AND-gate 30 generate a control signal for opening gate means 15. For simplicity it is only represented in FIG. 6 how preparation signal E(1) can be obtained. By squaring the points $r_a(i;m)$ and $r(i;m)$ of block m in the respective squaring circuits 31,32 and subsequently averaging the obtained values $[r_a(i;m)]^2$ and $[r(i;m)]^2$ for block m, with the aid of the respective summing circuits 33,34, signals $L[r_a(k)]$ and $L[r(k)]$ are obtained representing the level of the signals $r_a(k)$ and $r(k)$ as the means value of the power of the signal samples over a block m. These signals $L[r_a(k)]$ and $L[r(k)]$ are applied to a comparator 35 which generates a preparation signal E(1) when condition (1) is satisfied. The preparation signals E(2) and E(3) are generated in a similar manner when condition (2) is satisfied for the signals $r_a(k)$ and $z(k)$, and condition (3) for the signals $z(k)$ and $x(k)$, respectively. A control signal for opening the gate means 27 is generated when condition (4) is satisfied. As already stated before, condition (4) is just the opposite to condition (3) and hence the control signal for opening the gate means 27 can be obtained in an easy manner by inverting preparation signal E(3) by means of a NAND-gate 36.

Basically, it is possible in FIG. 6 to utilize the known property of an N-point DFT that the mean value of the power in a block of N points is provided by an expression which, apart from a constant scale factor 1/N, has the same form for points in the frequency-domain as for points in the time-domain. For example, signal $L[r_a(k)]$ can be derived from the frequency-domain points $R_a(p;m)$ at the output of transforming means 19 in FIG. 5 by utilizing squaring circuit 31 and summing circuit 33 and using a suitably chosen scale factor.

By implementing the specific filter combination of FDAF and TDPF according to the invention all conditions which are to be made on an echo canceller for applications in the field of acoustics can be satisfied, that is to say: fast convergence, negligible delay, good double-talk protection and reduced complexity.

In addition, the presence of a programmable memory 9(1) for the filter coefficients of TDPF 9 enables to perform a preprogramming when echo canceller 1 is used in a loudspeaking telephone set as described with reference to FIG. 1. A considerable portion of the impulse response of echo path 8 between loudspeaker 5 and microphone 6 in FIG. 1 is determined by the spatial structure of the set itself and is thus known a priori. Hence the impulse response of echo path 8 can in the first instance be reasonably approximated by a model based on a priori known data, and the filter coefficients representing this approximated model can then be preprogrammed as fixed initial values in the memories 9(1) of TDPF 9 when installing the telephone set.

What is claimed is:

1. A digital echo canceller with a receive path between a receive input and receive output, and a send path between a send input and a send output, said echo canceller being used for cancelling an additive echo signal at the send input which has occurred in response to a receive input signal applied to the receive input, said echo canceller comprising:

a filter combination comprising a first digital filter with a programmable filter coefficient memory for generating in response to the receive input signal a first replica signal which is an estimate of the echo signal, and a second, adaptive digital filter with a filter coefficient memory for generating in response to the receive input signal a second replica signal which is an estimate of the echo signal, the second digital filter further including means for forming an error signal that is representative of the difference between a signal applied to the send input and the second replica signal, and an adaptation processor for adaptively modifying filter coefficients in response to the receive input signal and the error signal and applying the modified filter coefficients to the filter coefficient memory of this second digital filter;

means for forming a send output signal as the difference between the signal applied to the send input and the first replica signal;

controllable gate means for selectively applying the modified filter coefficients to the programmable filter coefficient memory of the first digital filter; and control means for blockwise respectively determining the levels of the error signal and the send output signal, and for generating in response to the levels thus found a control signal for the gate means which depends in a predetermined manner on differences between said levels;

characterized in that:

in the said filter combination the second digital filter is a frequency-domain block-adaptive filter having a block length of N' components and having, for each signal block m, a number of N' frequency-domain filter coefficients W(p;m) with p=0,1,2,..,N'−1, and the first digital filter is a time-domain programmable digital filter having a number of N time-domain filter coefficients w(i;m) with i=0,1,2,...,N−1, with N' exceeding N; and the echo canceller further includes transforming means, cascaded with the gate means, for forming the N time-domain filter coefficients w(i;m) required in the first digital filter as components of an N'-point Discrete Orthogonal Transform of a block of N' frequency-domain filter coefficients W(p;m).

2. A digital echo canceller as claimed in claim 1, characterized in that the echo canceller also comprises a cascade arrangement of second controllable gate means and second transforming means for forming the N' frequency-domain filter coefficients W(p;m) as components of a Discrete Orthogonal Transform of the N filter coefficients w(i;m) in the programmable filter coefficient memory of the first digital filter and for selectively feeding back the thus formed filter coefficients W(p;m) to the second digital filter; and the control means are also arranged for blockwise determining the respective levels of the receive input signal and the send input signal, and for generating a second control signal for opening the second gate means if the level of the receive input signal thus determined is lower than the level of the send signal thus determined.

3. A digital echo canceller as claimed in claim 2, characterized in that the programmable filter coefficient memory of the first digital filter is preprogrammed by inputting a number of N filter coefficients w(i;m) representing a first approximation of the impulse response of the echo path.

4. A digital echo canceller as claimed in claim 2, as a part of a loudspeaking telephone set.

5. A digital echo canceller as claimed in claim 1, as a part of a loudspeaking telephone set.

6. A digital echo canceller as claimed in claim 1, characterized in that the programmable filter coefficient memory of the first digital filter is preprogrammed by inputting a number of N filter coefficients w(i;m) representing a first approximation of the impulse response of the echo path.

7. A digital echo canceller as claimed in claim 6, as a part of a loudspeaking telephone set.

* * * * *